United States Patent
Eckl et al.

(10) Patent No.: US 7,613,015 B2
(45) Date of Patent: Nov. 3, 2009

(54) VOLTAGE CONVERTER

(75) Inventors: Gerald Eckl, Schleinbach (AT); Lorand Cesnak, Vienna (AT)

(73) Assignee: Siemens AG Osterreich, Vienna (AT)

( * ) Notice: Subject to any disclaimer, the term of this patent is extended or adjusted under 35 U.S.C. 154(b) by 397 days.

(21) Appl. No.: 10/569,010

(22) PCT Filed: Aug. 9, 2004

(86) PCT No.: PCT/AT2004/000283

§ 371 (c)(1),
(2), (4) Date: Oct. 18, 2006

(87) PCT Pub. No.: WO2005/020415

PCT Pub. Date: Mar. 3, 2005

(65) Prior Publication Data

US 2007/0139972 A1      Jun. 21, 2007

(30) Foreign Application Priority Data

Aug. 20, 2003   (AT)  .............................. A 1312/2003

(51) Int. Cl.
*H02M 3/335* (2006.01)
(52) U.S. Cl. ...................................... 363/16
(58) Field of Classification Search .................. 363/15, 363/16, 17, 78, 95, 97, 131
See application file for complete search history.

(56) References Cited

U.S. PATENT DOCUMENTS

| | | | |
|---|---|---|---|
| 5,272,614 A | 12/1993 | Brunk et al. | |
| 5,473,530 A | 12/1995 | Giuseppe et al. | |
| 6,538,909 B2 * | 3/2003 | Goodarzi et al. | ............... 363/98 |
| 6,771,059 B1 * | 8/2004 | Zwicker | ...................... 324/119 |
| 6,801,027 B2 * | 10/2004 | Hann et al. | ................... 323/282 |
| 7,428,159 B2 * | 9/2008 | Leung et al. | ................... 363/95 |
| 2002/0186576 A1 * | 12/2002 | Kanouda et al. | ............ 363/125 |
| 2002/0190577 A1 | 12/2002 | Jenni | |
| 2003/0117752 A1 | 6/2003 | Gilbert et al. | |
| 2004/0075600 A1 | 4/2004 | Vera et al. | |

FOREIGN PATENT DOCUMENTS

| | | |
|---|---|---|
| GB | 2 301 239 | 11/1996 |
| JP | 2000333455 | 11/2000 |

OTHER PUBLICATIONS

International Search Report of PCT/AT2004/000283 dated Jan. 24, 2005.

* cited by examiner

*Primary Examiner*—Adolf Berhane

(57) ABSTRACT

The invention relates to a voltage converter for converting a primary/secondary voltage into a secondary/primary voltage, comprising at least one controlled switch, wherein a control circuit controls, according to its supplied set points, the at least one controlled switch with a variable pulse duty factor and/or variable control times and/or variable frequency. The invention further comprises a digital signal processor for the running calculation of the set values for the control circuit, and the voltage converter comprises a (bus) interface via which operating parameters can, from an external control center, be transmitted to the digital signal processor and preset.

9 Claims, 1 Drawing Sheet

VOLTAGE CONVERTER

CROSS-REFERENCE TO RELATED APPLICATION

This application is a U.S. National Stage application of PCT Application No. PCT/AT 2004/000283, filed Aug. 9, 2004, which claims priority from Austrian Application No. A 1312/2003, filed on Aug. 20, 2003.

FIELD OF THE INVENTION

The present invention pertains to a voltage converter for converting a primary/secondary voltage into a secondary/primary voltage, comprising at least one controlled switch, wherein a control circuit controls, according to its supplied set values, the at least one controlled switch with a variable pulse duty factor and/or variable control times and/or variable frequency.

BACKGROUND OF THE INVENTION

Voltage converters of the type related to the subject have become known in various embodiments. For example, JP 2000333455 A shows a bidirectional voltage converter for DC voltage. U.S. Pat. No. 5,473,530, in which it is also explained how an AC voltage can be produced at a pulse-width-modulated signal, shows a DC voltage/AC voltage converter, which only works in a unidirectional manner, however. A direct conversion of a mains-frequency alternating input voltage into a likewise mains-frequency alternating output voltage is described in GB 2 301 239 A, whereby a step-down regulator designed as a flow-through converter without galvanic separation is used, which works with high switching frequency.

Usually voltage converters work fully self-sufficiently, e.g., in industrial operations, whereby they can, if necessary, be switched off or on from a central point.

BRIEF SUMMARY OF THE INVENTION

One embodiment of the present invention creates a combinational circuit part, which can be used universally, is adapted in real time to current operating conditions and can be better monitored.

This is accomplished with a combinational circuit part of the type given in the introduction, in which, according to the present invention, a digital signal processor for the running calculation of set points is provided for the control circuit and the voltage converter comprises a (bus) interface, via which operating parameters can be transmitted to the digital signal processor and can be preset from an external control center.

Due to the present invention, a running adaptation of the operating parameters can take place during the operation, whereby the optimal settings, which are determined by the control center, e.g., by a central computer, for the respective operating state of a plant, in which the voltage converter works, can be transmitted to the converter via the interface.

One variant, in which the (bus) interface is bidirectional and operating data of the converter can be transmitted via the (bus) interface at the external control center, is advantageous.

It is particularly advantageous in this case if a memory is provided for the storage of operating data, which can be read out via the (bus) interface.

It is advantageous if an auxiliary energy memory HES is provided for the permanent energy supply of the digital signal processor DSP and/or of the real time clock RTC, for consequently a practically unlimited monitoring of the state is guaranteed. It is advisable if the auxiliary energy memory HES is reloaded in the presence of a primary voltage Up and/or a secondary voltage Us.

BRIEF DESCRIPTION OF THE DRAWINGS

The present invention together with further advantages is illustrated in detail below based on an exemplary embodiment, which is shown in the drawing.

DETAILED DESCRIPTION OF THE INVENTION

Figure 1:
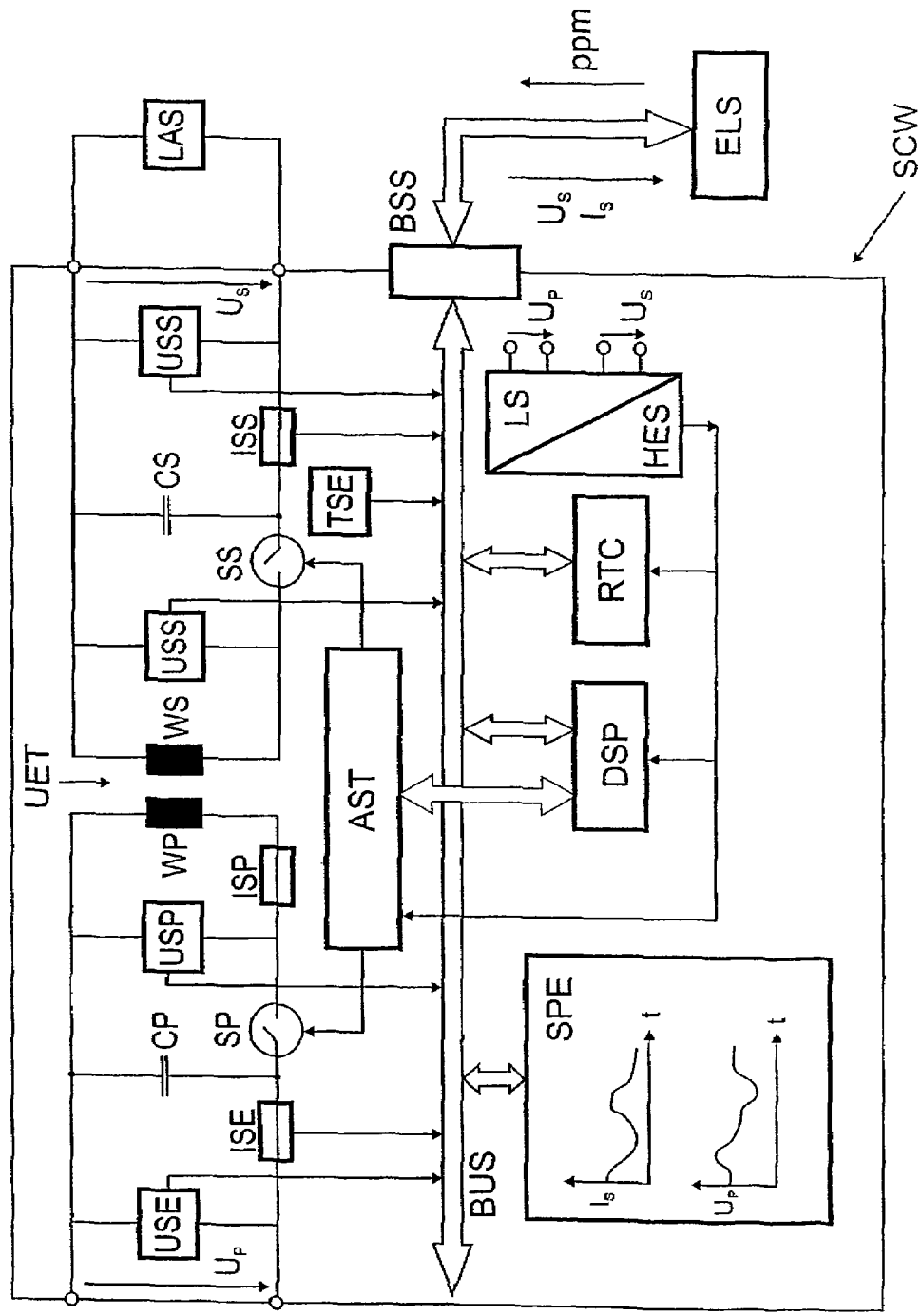

The voltage converter shown in the figure has a transformer UET comprising a primary winding WP and a secondary winding WS. A controlled primary switch $S_P$ lies on the primary side in a connecting line from a primary voltage $U_P$ to the primary winding WP. A capacitor CP lies parallel to the primary voltage $U_P$. An identical layout lies on the secondary side with a secondary switch SS in a connecting line between the secondary winding WS and the secondary voltage $U_S$, which lies at a capacitor CS. In the present case, a load LAS lying at the secondary voltage $U_S$ is drawn in, from which it is evident that, in the example shown, the flow of energy runs from the primary side with the primary voltage $U_P$ to the secondary side with the secondary voltage $U_S$. However, the converter may also have a bidirectional design, i.e., the load might lie at the primary side and the flow of energy may run in the opposite direction. The controlled switches SP and SS are controlled by a control circuit AST, which directly receives information here about the current through the primary winding WP by means of a current sensor ISP. The controlled switches SP and SS may be commercially available static switches. If the converter shall work bidirectionally, then bidirectional circuit elements are to be provided at this site, which conduct current in both directions and can maintain blocking voltage. If such switches are not available, then two primary switches, for example, must be provided symmetrically in both supply lines to the primary winding WP and the same applies logically for the secondary side.

Aside from the control circuit, the converter according to the present invention contains a digital signal processor DSP, which can exchange data via a bus BUS with the control circuit AST. Furthermore, a memory SPE is provided, which lies at the bus BUS at the same time. Via the BUS, optionally also directly, data are supplied to the digital signal processor DSP or even to the control circuit AST via current operating parameters, namely, in the present case, data about the primary voltage $U_P$ by means of a voltage sensor USE, about the input current by means of a current sensor ISE, about the voltage at the primary winding WP by means of a voltage sensor USP, about the voltage at the secondary winding WS by means of a voltage sensor USS, about the secondary or output current by means of a current sensor ISS and about the output voltage or secondary voltage by means of a voltage sensor USS. The voltage converter SCW comprises a (bus) interface BSS, via which it can be brought into connection with an external control center ELS. The control center ELS may be, for example, a central computer for a plant, in which one or more voltage converters according to the present invention are provided and supply parts of the plant with energy. The interface BSS may be designed as galvanic or optical or it may be a radio interface.

It should be noted here that the layout of the voltage converter with a primary winding and a secondary winding WP, WS and two controlled switches SP and SS shown is only one of many possible variants. The present variant may convert a DC or AC primary voltage into a DC or AC secondary voltage. Within the framework of the present invention, a voltage converter may, however, also be a usual clocked power supply unit, which produces an output DC voltage of, e.g., 12 V or 24 V from an AC input voltage of, e.g., 230 V after rectification. Likewise, it is of no significance for the present invention whether the converter is a blocking oscillator converter, a flux converter or a mixed type. Likewise, a transformer does not necessarily have to be provided if no galvanic separation is necessary. In this case, e.g., a single memory inductivity may be used. The mode of operation of prior-art voltage converters may be assumed and does not have to be explained in detail.

The essence of the present invention lies in the fact that the digital signal processor DSP is set up to perform running calculations of the set points for the control circuit AST, wherein the set points, as regulated variables for the control circuit, are changed according to measured operating parameters. For example, the pulse duty factor of the control pulses is changed and optionally their frequency as well. Likewise, the control times of the switches SP, SS, namely, the deviations of the switching on and switching off times from the fixed cycle can be changed, whereby, as is well known, short-circuit-like states are avoided by means of a suitable selection of these control times; on the other hand, by changing the control times, it is possible to optimize the operation, e.g., in terms of a compensation of deviations of the switching delays of the individual controlled switches. In addition to electrical values, temperature values, for example, which are measured at various elements of the voltage converter, likewise the ambient temperature, may also be taken into consideration. Acting for the temperature measurements, a temperature sensor TSE is drawn in here, which is arranged, for example, near the secondary switch SS and supplies its temperature information at the bus BUS.

The fact that operating parameters, which are designated here by ppm, can be transmitted via the (bus) interface BSS from the external control center ELS to the digital signal processor DSP and represent set points, which affect the function of the control circuit AST and thus of the converter as a whole, is important for the present invention.

A running adaptation of the operating parameters during the operation, which are determined, e.g., by a central computer, is made possible thanks to the present invention. For the optimal operating state of the plant, e.g., standby, starting, full load, partial load, etc., optimal settings are transmitted via the (bus) interface BSS and the software of the digital signal processor DSP recognizes the requirements of these new operating parameters. In the manner of an interrupt routine, the new parameters can be read in and be incorporated as new set values into the running control algorithms via suitable iteration cycles. All this can take place with the voltage converter running, i.e., without interruption.

The acknowledgement of current conditions, such as, e.g., of the input voltage $U_P$ or of the output current $I_S$ may also be required via the (bus) interface BSS from the external control center ELS, which is illustrated in the drawing by an arrow. The corresponding values are available as digitized measured variables in any case in the voltage converter, and thus the corresponding variables can be outputted via the (bus) interface with little software effort.

As far as the memory SPE is concerned, selected operating data, e.g., the input voltage $U_P$ and the output current $I_S$ can thus be stored in this memory, which is illustrated in the drawing by means of time-dependency diagrams. Consequently, the function of a storage monitor is integrated in the voltage converter, and for startup, service or analysis purposes, it is possible to read out data of earlier operating conditions, e.g., those which concern a mains breakdown, a short circuit, etc.

For the use as a mains monitor, it may be advantageous to preset tolerances for "normal ranges," within which no explicit recording (storage of time values of operating parameters) takes place. If one or more of these state variables leaves this range, then the storage monitor is triggered. Thus, the efficiency of the data memory is increased.

In order to achieve a further increase in the information density (data memory utilization), the operating states mentioned above are determined on an "incremental" basis: Time points, at which changes in parameter values definable beforehand arise, are stored rather than periodically scanned time values of parameters. For example, the amount of mains voltage every x msec is not entered in a table, but rather that time point, at which the mains voltage leaves the tolerance limit of 230 V+10-15% and enters a tolerance limit of definable width lying below (−) or above (+) it.

In order to optimize this method, it is advantageous if a Real Time Clock RTC is located on the periphery of the digital signal processor DSP—the data values determined according to the above method may thus be related to the current date and time.

Thus, a practically unlimited monitoring of the state is guaranteed by means of a permanent energy supply of the digital signal processor DSP and of the real time clock RTC. This energy supply may take place by means of a capacitor, storage battery or regular battery, for which an auxiliary energy memory HES is provided, which is always reloaded by a charging circuit LS if a primary voltage Up and/or a secondary voltage Us is present.

Although the invention is illustrated and described herein with reference to a specific embodiment, the invention is not intended to be limited to the details shown. Rather, various modifications may be made in the details within the scope and range of equivalents of the claims and without departing from the invention.

We claim:

1. A voltage converter for converting a primary/secondary voltage into a secondary/primary voltage, comprising:
    at least one controlled switch,
    a control circuit that controls, according to its supplied set points, the at least one controlled switch with a variable pulse duty factor and/or variable control times and/or variable frequency,
    a digital signal processor for the calculation of the set points for the control circuit,
    wherein the voltage converter comprises an interface bus, via which operating parameters can be transmitted to the digital signal processor and can be preset from an external control center,
    wherein the interface bus is bidirectional and operating data of the converter can be transmitted via the bus at the external control center,
    the voltage converter further comprising an auxiliary energy memory for a permanent energy supply to the digital signal processor and/or a real time clock.

2. The voltage converter in accordance with claim 1, further comprising a real time clock in order to correlate operating data with time values.

3. The voltage converter in accordance with claim 1, further comprising a memory for the storage of operating data, which can be read out via the bus interface.

4. The voltage converter in accordance with claim 1, wherein the auxiliary energy memory is reloaded in the presence of primary voltage and/or secondary voltage.

5. The voltage converter in accordance with claim 1, wherein the real time clock is configured to correlate operating data with time values.

6. A voltage converter for converting a primary/secondary voltage into a secondary/primary voltage, comprising:
- at least one controlled switch,
- a control circuit that controls, according to its supplied set points, the at least one controlled switch with a variable pulse duty factor and/or variable control times and/or variable frequency,
- a digital signal processor for the calculation of the set points for the control circuit,
- wherein the voltage converter comprises an interface bus, via which operating parameters can be transmitted to the digital signal processor and can be preset from an external control center, wherein the bus is bidirectional and operating data of the converter can be transmitted via the bus at the external control center,
- the voltage converter further comprising a memory for the storage of operating data, which can be read out via the bus and an auxiliary energy memory for a permanent energy supply to the digital signal processor and/or a real time clock.

7. A voltage converter for converting a primary/secondary voltage into a secondary/primary voltage, comprising:
- at least one controlled switch,
- a control circuit that controls, according to its supplied set points, the at least one controlled switch with a variable pulse duty factor and/or variable control times and/or variable frequency,
- a digital signal processor for the calculation of the set points for the control circuit, wherein the voltage converter comprises an interface bus, via which operating parameters can be transmitted to the digital signal processor and can be preset from an external control center, wherein the bus is bidirectional and operating data of the converter can be transmitted via the bus at the external control center, the voltage converter further comprising a real time clock to correlate operating data with time values and an auxiliary energy memory for a permanent energy supply to the digital signal processor and/or the real time clock.

8. the converter in accordance with claim 6, wherein the auxiliary energy memory is reloaded in the presence of primary voltage and/or secondary voltage.

9. A voltage converter for converting a primary/secondary voltage into a secondary/primary voltage, comprising:
- at least one controlled switch,
- a control circuit that controls, according to its supplied set points, the at least one controlled switch with a variable pulse duty factor and/or variable control times and/or variable frequency,
- a digital signal processor for the calculation of the set points for the control circuit, wherein the voltage converter comprises an interface bus, via which operating parameters can be transmitted to the digital signal processor and can be preset from an external control center,
- wherein the bus is bidirectional and operating data of the converter can be transmitted via the bus at the external control center, the voltage converter
- further comprising a real time clock to correlate operating data with time values and an auxiliary energy memory for a permanent energy supply to the digital signal processor and/or the real time clock, wherein the auxiliary energy memory is reloaded in the presence of primary voltage and/or secondary voltage.

* * * * *

UNITED STATES PATENT AND TRADEMARK OFFICE
CERTIFICATE OF CORRECTION

PATENT NO. : 7,613,015 B2  Page 1 of 1
APPLICATION NO. : 10/569010
DATED : November 3, 2009
INVENTOR(S) : Eckl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 652 days.

Signed and Sealed this

Nineteenth Day of October, 2010

David J. Kappos
*Director of the United States Patent and Trademark Office*